Aug. 3, 1971    L. C. LYNWORTH    3,597,316
NUCLEAR REACTOR THERMOMETRY
Filed March 18, 1968    2 Sheets-Sheet 2

INVENTOR
LAWRENCE C. LYNNWORTH
BY
Kenway, Jenney & Hildreth
ATTORNEYS

United States Patent Office 3,597,316
Patented Aug. 3, 1971

3,597,316
NUCLEAR REACTOR THERMOMETRY
Lawrence C. Lynnworth, Waltham, Mass., assignor to Panametrics, Inc., New York, N.Y.
Filed Mar. 18, 1968, Ser. No. 713,889
Int. Cl. G21c 17/10
U.S. Cl. 176—19
13 Claims

ABSTRACT OF THE DISCLOSURE

A system for measuring temperature inside a liquid cooled nuclear reactor by measuring the propagation of pulses of ultrasonic energy transmitted along elements of the reactor itself. The ultrasonic pulses may be transmitted along the cladding of the fuel elements, through the fissionable material or through the spacer wires surrounding each element. Since the propagation of the ultrasonic waves in a medium is a function of the temperature of the medium, this measured propagation indicates the temperature.

FIELD OF THE INVENTION

This invention relates in general to ultrasonic thermometry and more particularly to a system for measuring the internal temperatures of a nuclear reactor by measuring the ultrasonic transmission along or through elements of the reactor.

BACKGROUND OF THE INVENTION

In nuclear reactors, particularly in experimental breeder nuclear reactors, there are a number of requirements for temperature measurements at various points within the reactor. The reactor typically consists of a cylindrical tank perhaps fifty feet in diameter containing an array of fuel pins immersed in a coolant such as water, or liquid sodium. Each fuel pin is approximately ¼" in diameter and three feet long and fuel pins in the array are separated by spiral spacer wires. In the usual configuration, the fuel pins are formed of a stainless steel cladding .010 inch thick surrounding a fissionable fuel material, which may be pellets of uranium oxide, a solid rod of uranium oxide in a ceramic form mixed oxides or fissium wires. The spacer wire is a $\frac{1}{16}$" diameter stainless steel wire wound spirally around the fuel pin.

Temperature measurements are required at several different points in the reactor, depending upon the particular reasons for determining the temperature. There are a variety of reasons such as studying the temperature dependence of the Doppler effect, control and measurement of the reactor performance and measurements related to reactor safety. Thus, temperature determinations may be required for a specific portion of the fissionable material or over all of it; in the cladding of the fuel pin, either at a particular point or the distribution over the length of the pin; and at various points in the coolant. The temperatures encountered will vary from point to point in the reactor and will depend upon the particular materials. In the fuel itself, when a metallic alloy is used such as fissium, the temperatures may approach the alloy eutectic point (approximately 2000° F.). When the fuel is uranium oxide or plutonium oxide, temperatures up to about 5,000° F. may be developed. The temperatures required to be measured in the cladding may approach 2,000° F., while the temperature in the sodium coolant will normally be about 100° F. less than that of the cladding.

These type of temperature measurements have been made in the past by the use of thermocouples. Temperatures up to 2,000° F. may be measured by the use of a chromel/alumel thermocouple and temperatures up to 5,000° F. are theoretically within the range of tungsten/rhenium thermocouples. Thermocouples have, however, not been entirely satisfactory for measurements within these reactors. Thus, radiation induced electrical noise and radiation induced transmutation in the thermocouples introduce errors and uncertainties in the measurements. A tungsten/rhenium thermocouple is mechanically brittle which imposes a further limitation on the use of this type of thermocouple at the high temperatures. Since the measurements are electrical in nature the electrical insulators used must be able to withstand temperatures in excess of 4,000° F., yet reliable insulators for operation in this temperature region are not generally available.

Perhaps the most serious problem, however, arises from the necessity of introducing foreign materials into the region of interest with the resultant perturbation of the local temperature as well as possible adverse effects on the reactor performance.

SUMMARY OF THE INVENTION

In the measurement system of the present invention, temperatures within the nuclear reactor are determined by measurement of the transmission velocity and/or attenuation of pulses of ultrasonic energy along various portions of the fuel elements and spacer wires within the reactor. A generator of pulses of ultrasonic energy, such as a magnetostrictive transducer or a piezoelectric transducer is acoustically coupled to the cladding, the fissionable material or the spacer wire through a lead-in wire or tube. The lead-in wire which may typically be formed of material such as $\frac{1}{16}$" diameter stainless steel can convey pulses of ultrasonic energy for distances up to one hundred feet, around bends, through pressure seals and through the coolant material. An acoustical mismatch may be created between the lead-in and the element thereby generating a reflection indicating when the ultrasonic pulse reaches the element to which the lead-in wire is connected. The time required for transmission of this pulse from that initial point to a second selected point on the element may then be measured by conventional equipment to derive the velocity of the ultrasonic pulse. This second point on the element may be the end of the element, which would cause a reflection, or may be a portion of the element which has been specifically perturbed, such as by a notch or ring of additional material, to produce a reflection.

The ultrasonic waves generated and transmitted along these elements may either be extensional (longitudinal) waves or shear (torsional) waves. The velocity $V_o$ of extensional waves is related to Young's modulus E as follows:

$$V_o = \sqrt{E/\rho}$$

where $\rho$ is the density of the transmission medium. The torsion wave velocity $V_t$ is related to the shear modulus G by the equation $$V_t = \sqrt{G/\rho}$$

Both of these moduli decrease as temperature increases and hence both sensitivity and accuracy improve at the higher temperatures. It should be noted that the temperature is derived from measurement of acoustic transmission and hence electrical noise generated within the reactor does not result in errors or inaccuracies in the temperature determination. Similarly compositional changes due to transmutation do not significantly effect the measurement because sound velocity is substantially independent of such changes. Embrittlement and other radiation damage, however, may degrade the ultrasonic measurements somewhat.

DESCRIPTION OF A PREFERRED EMBODIMENT

Figure 1:
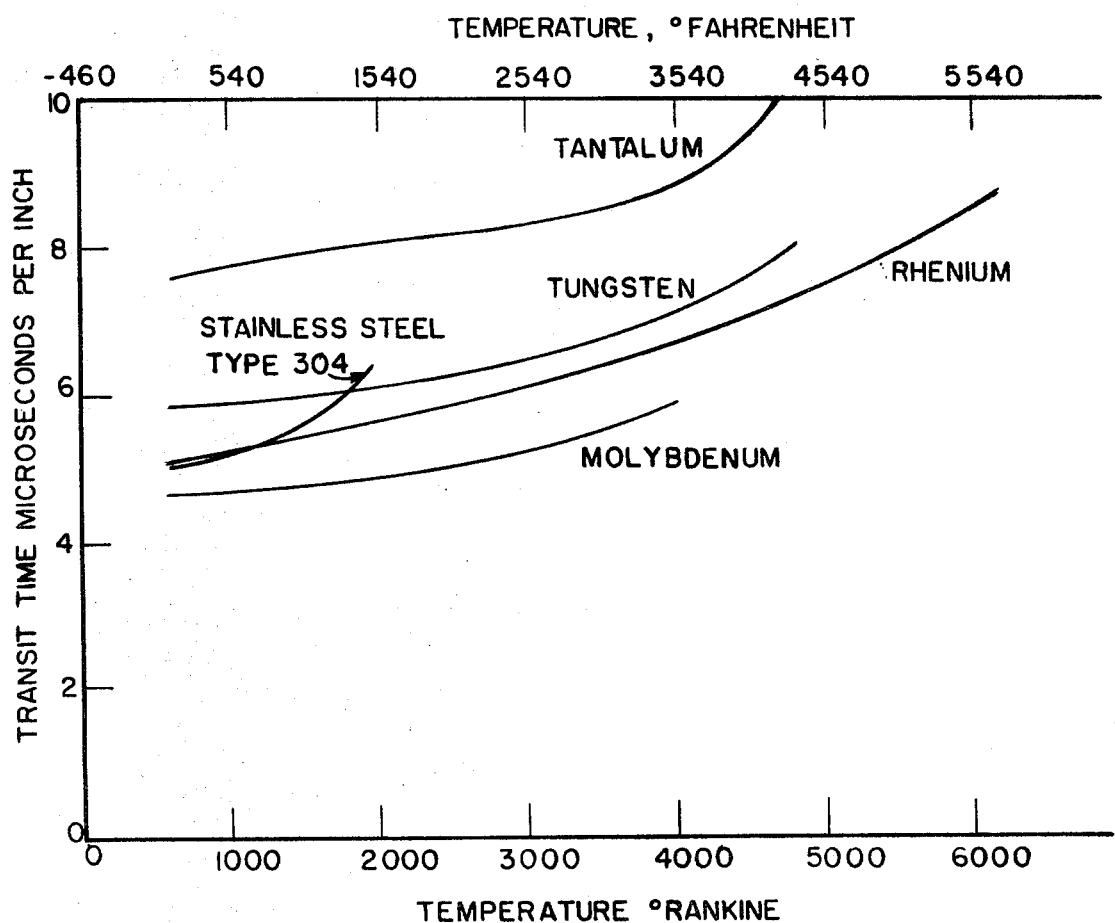
FIG. 1 is an illustration in graphic form of the relationship between inverse velocity of ultrasonic waves and temperature for specific materials.

With reference now to FIG. 1, there is illustrated the relationship between temperature and the inverse velocity of extensional ultrasonic waves for a variety of materials. From the curves of FIG. 1, it can be seen that the transit time over a specific distance for extensional waves increases with increasing temperature. An output indication, therefore, of the time required for an extensional ultrasonic wave to travel a specified distance in the medium whose temperature is to be determined represents directly the temperature of that medium.

Figure 2:
FIG. 2 is an illustration in perspective view of a typical fuel element for a liquid cooled breeder nuclear reactor.
Figure 3:
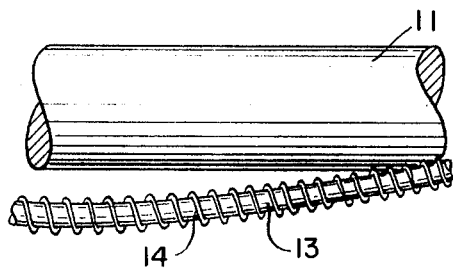
FIG. 3 is an enlarged view of a portion of a second embodiment of the fuel element of FIG. 2.

In FIG. 2, there is illustrated a typical fuel element assembly for a liquid cooled breeder nuclear reactor. The assembly consists of the fuel pin 11 which is surrounded by a spiral spacer wire 13 which surrounds, but is not joined to the fuel pin, except at the ends, and possibly one or two other points. The spacer wire serves the function of ensuring that the fuel elements in an assembly within the sodium coolant are sufficiently spaced so they can be cooled efficiently. In FIG. 3 there is shown an enlarged portion of an alternative embodiment of the fuel element. In this embodiment the spacer wire 13 is itself surrounded by a coil of isolation wire 14. This wire 14 has a diameter approximately one tenth that of the spacer wire. The isolator wire 14 serves to acoustically isolate the spacer wire from its associated fuel pin and from other fuel pins and spacer wires in the reactor assembly, while maintaining good thermal contact with the surrounding media.

The fuel pin dimensions are approximately ¼" O.D. by 3' in length, while the spacer wire is a 1/16" diameter wire. As earlier discussed, the fuel pin consists of a cladding surrounding the fissionable material. The latter may be in the form of plutonium or uranium oxide pellets, a solid plutonium or uranium oxide rod, mixed oxides such as 20% plutonium oxide plus 80% uranium oxide or an alloy of uranium called fissium. When certain fuels are used, liquid sodium may be used also inside the pin as a coolant. The fuel pin is capped with an inert gas such as helium. The spacer wire material and the cladding material must be identical in order to prevent transport of the elements within the reactor. One suitable material for this purpose is 304 stainless steel. The assembly including the fuel pin cladding and the spacer wire will be referred to in combination as a fuel element.

In order to measure the velocity of ultrasonic pulses along all or portions of the fuel element, it is necessary to couple the ultrasonic pulses to the fuel element and to provide a system for determining the transit time of an applied pulse between two points on the element. In some instances, where it is desired to measure the temperature of a specific portion of the element, the two points will be selected to include only that portion. In other instances, it may be desired to measure the average temperature over the entire element and, in those cases, the transit time of the ultrasonic pulse over the entire element will be determined.

Figure 4:
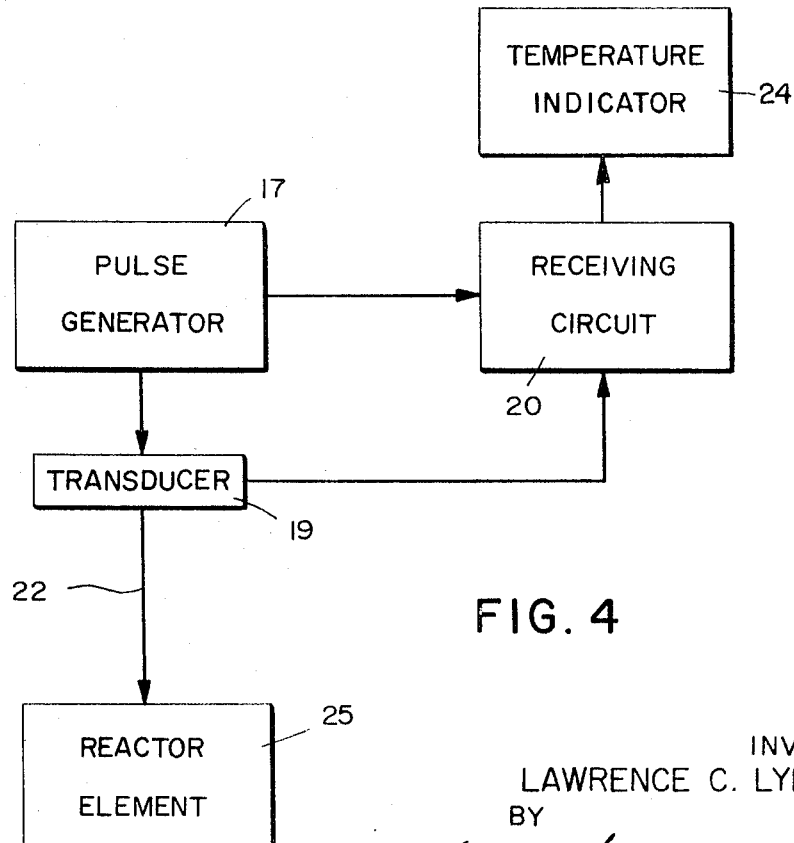
FIG. 4 is an illustration in block diagrammatic form of a measurement system constructed in accordance with the principles of this invention.

In FIG. 4, a system for measuring the transit time of ultrasonic pulses along selected portions of the fuel element is shown. The system includes a pulse generator 17 which provides output pulses to both a transducer 19 and a receiving circuit 20. The transducer 19 provides ultrasonic energy through a coupling element 22 to the nuclear reactor element 25. The coupling element 22 also serves to couple ultrasonic energy from the reactor element 25 back to the transducer 19. The transducer 19 may be any conventional transducer for generating short pulses of ultrasonic energy in response to applied electrical signals and for receiving pulses of ultrasonic energy and generating in response thereto electrical signals.

In one form the transducer may be a unified element such as a piezoelectric crystal. One such crystal which is capable of operation up to ~2200° F. is lithium niobate.

The transducer may also be made of a magnetostrictive material. A magnetostrictive transducer can be formed of a wire with a driving coil around one portion of it and a receiving coil around a second portion of it. Electrical energy applied to the driving coil will generate an ultrasonic pulse which is transmitted along the wire, while an ultrasonic wave transmitted from the sensor back to the transducer wire would result in an electrical signal being generated within the receiver coil. One material which is suitable for such a transducer is .050" diameter Remendur wire. This material has a curie point of approximately 1600° F. It is manufactured by the Wilbur Driver Company of Harrison, N.J.

The pulse generator 17 may be any suitable pulse generator capable of exciting the transducer 19. Typically the pulse generator may be required to produce pulses at a repetition rate of 100 to 200 pulses per second with pulse widths in the order of 1 to 3 microseconds. The power requirements will depend upon the particular transducer employed, however generally they must be capable of providing an output pulse power of ~1 to 10 watts. Both the pulses from the pulse generator 17 and those generated in transducer 19 are coupled to a receiving circuit 20. The receiving circuit is generally formed of a combination of discriminators and an output display such as an oscilloscope. The pulse from the pulse generator 17 will initiate a timing cycle in the receiving circuit 20 and pulses from the transducer 19 corresponding to the ultrasonic wave arriving at the first point on the reactor element 25 and corresponding to the same wave reaching the second measurement point on the reactor element 25 are then coupled into the receiving element. The time between these pulses is then indicative of the transit time of the ultrasonic pulse between the these two specified points. A commercially available unit to perform the functions of the pulse generator 17 and receiving circuit 20 is manufactured by the Panametrics Corporation of Waltham, Mass. under the designation Pana-Therm.

One means of generating the pulses indicative of the ultrasonic wave arriving at a specified point on the reactor element, involves the creation of acoustical impedance mismatches thereby causing reflections which will result in electrical pulses being generated at the receiving transducer. Such reflections may be generated by changes in the material, changes in the diameter between the coupling element 22 and the portion of the reactor element 25 to which the ultrasonic energy is connected, changes in the shape, kinks in wire, where wire is the transmission medium, and the use of a foreign material placed in contact with the transmission material, for example, washers placed around a wire or tubular element.

The amplitude reflection coefficient R may be expressed as, $$R = \frac{Z_2 - Z_1}{Z_2 + Z_1}$$

where $$Z_1 = \rho_1 V_o A_1$$
$$Z_2 = \rho_2 V_o A_2$$

for extensional mode waves and $$Z_1 = \rho_1 V_T J_1$$
$$Z_2 = \rho_1 V_T J_2$$

for torsional mode waves, wherein $\rho$ = density of material $$V_o = \sqrt{\frac{E}{\rho}} = \text{extensional wave velocity}$$

$$V_T = \sqrt{\frac{G}{\rho}} = \text{torsional wave velocity}$$

A = cross section area of material
J = polar moment of inertia of material

The coupling element 22 is usually in the form of a tube or wire connecting the transducer 19 to the fuel element. The choice of tube or wire may be dictated by the type of reflection coefficient sought and the points between which the measurement is to be made. If, for example, the average transmission over the entire length of the spacer wire is to be measured, then a tubing with a diameter of 1/16" may be spot welded to the spacer wire and the change in shape then creates a reflection at the junction between the tubing and the spacer wire which serves as an indicator of the initial measurement point. The spacer wire is usually spot welded to the cladding at the far end of the element and this contact between the wire and a different body, even though it be of the same material, generates a second reflection. By measuring the time between the two reflections, a measure of the transit time of the ultrasonic pulse along the spacer wire is obtained.

Figure 5:
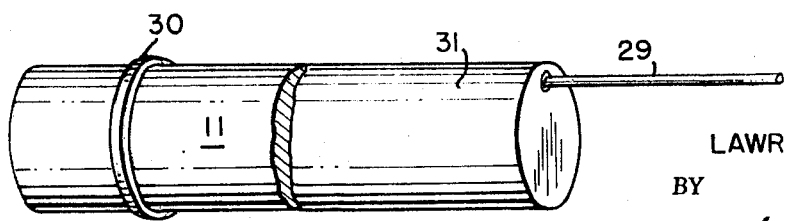
FIG. 5 is an illustration of a portion of a fuel element modified for use in the practice of this invention.

As illustrated in FIG. 15 where the cladding itself is to serve as the transmission material, a tube or wire 29 of stainless steel may be spot welded to the cladding 31 and this initial junction will generate a reflection serving as the starting point for the transit time measurement. If the transmission along the entire length of the cladding is to be determined, then the discontinuity at the far end of the cladding will generate the second reflection pulse. If a lesser portion of the fuel pin is to be measured, a reflection may be established at a selected point either by grooving, such as by scratching or indenting the cladding slightly at the point or, as shown in FIG. 5, by attaching a reflecting material element, such as a stainless steel ring 30 to the cladding 31 at this second point. Similarly, a second point may be established on the spacer wire by a similar technique.

In some instances the transducer may be connected directly to the element itself, without any intermediate coupling. In those instances, the initiation of the pulse in the transducer will serve as the first time marker and the reflection will be generated in the same fashion as in the case where a coupling element is employed. When the transmission characteristics are measured directly in the fissionable material the interface between the cladding and the material may be used to generate the starting point pulse.

Besides measuring transit time and velocity, it will sometimes be desirable to measure attenuation over all or part of the fuel pin. Attenuation is a function of temperature. Echoes from a particular point may be greatly attenuated when melting occurs at or near that point. Likewise attenuation measured over a particular path may indicate incipient boiling or other important reactor characteristics.

Having described the invention various modifications and improvements will now occur to those skilled in the art and the invention described herein should be construed as limited only by the spirit and scope of the appended claims.

What is claimed is:

1. In a liquid cooled nuclear reactor having an array of fuel elements, each fuel element including as components a fuel pin and a spacer wire for maintaining the spacing of the pins in the array, where the fuel pin is formed of a fissionable material enclosed in a cylindrical cladding, the system for measuring temperature within said reactor comprising,
   a generator for generating pulses of ultrasonic energy,
   coupling means for coupling said generated pulses of ultrasonic energy to one component of said fuel element,
   circuit means for measuring the propagation of said ultrasonic pulses from one selected point on the coupled component of said fuel element to a second selected point on said coupled component of said fuel element said selected points being characterized by predetermined acoustic discontinuities producing specific forms of reflection pulses, said circuit means being selectively responsive to reflection pulses from said selected points and,
   indicating means producing an output signal related to said propagation as indicative of the temperature in the region of said fuel element.

2. A temperature measuring system in accordance with claim 1 wherein said circuit means measures the transit time required for said ultrasonic pulses to pass between said selected points and wherein said indicating means, output signal is related to said transit time.

3. A temperature measuring system in accordance with claim 1 wherein said circuit means measures the change in amplitude of said ultrasonic pulse between said selected points and wherein said indicating means output signal is related to said change in amplitude.

4. A temperature measuring system in accordance with claim 1 wherein said ultrasonic pulses are coupled to said cylindrical cladding.

5. A temperature measuring system in accordance with claim 4 wherein said coupling is such that a significant portion of ultrasonic energy from each of said pulses is reflected from the intersection between said coupling means and said cladding and wherein said cladding has an ultrasonic transmission discontinuity at a second point removed from said intersection, said circuit means measuring the elapsed time between the reflection from said intersection and the reflection from said discontinuity.

6. A temperature measuring system in accordance with claim 4 wherein said cladding includes at least two separate ultrasonic transmission discontinuities and wherein said circuit means measures the elapsed time between ultrasonic reflections generated at said discontinuities.

7. A measurement system in accordance with claim 1 wherein said ultrasonic pulses are coupled to said spacer wires, said spacer wires being formed with at least two ultrasonic transmission discontinuities at selected points, said circuit means measuring the transmission of ultrasonic pulses between said discontinuities.

8. A measurement system in accordance with claim 7 wherein said ultrasonic transmission discontinuities are kinks in said spacer wire.

9. A system in accordance with claim 7 wherein said coupling means is a cylindrical element having an impedance different from said spacer wire.

10. A temperature measuring system in accordance with claim 1 wherein said ultrasonic pulses are coupled to said spacer wire, said coupling being such that a significant portion of said ultrasonic energy is reflected from the intersection between said coupling means and said spacer wire and wherein said spacer wire has an ultrasonic discontinuity at a selected point removed from said intersection, said circuit means measuring the transmission of ultrasonic pulses between said intersection and said discontinuities.

11. A temperature measuring system in accordance with claim 10 wherein said circuit means measures the transit time between said reflections.

12. A temperature measuring system in accordance with claim 10 wherein said circuit means measures the change in amplitude of ultrasonic pulses between said reflections.

13. A temperature measuring system in accordance with claim 1 wherein said ultrasonic pulses are coupled to said fissionable material.

References Cited

UNITED STATES PATENTS

| | | | |
|---|---|---|---|
| 3,137,169 | 6/1964 | Clement et al. | 73—339 |
| 3,240,674 | 3/1966 | Ledwidge | 176—19 |
| 3,264,863 | 8/1966 | Maropis | 176—19X |
| 3,296,864 | 1/1967 | Kealy et al. | 73—339 |
| 3,310,474 | 3/1967 | Saunders | 176—68X |
| 3,318,778 | 5/1967 | Morita | 176—68X |
| 3,350,942 | 11/1967 | Peltola | 73—339 |

FOREIGN PATENTS

| | | | |
|---|---|---|---|
| 996,512 | 6/1965 | Great Britain | 176—19 |

OTHER REFERENCES

Fourth International Congress on Acoustics, 1962, "The Measurement of High Temperatures by the Determination of the Velocity of Sound Waves in Materials," by E. A. Thorne, p. 23, pp. 1–3.

Philosophical Magazine, vol. 2, ser. 8, No. 21, September 1957, pp. 1113–1120, by J. F. W. Bell.

CARL D. QUARFORTH, Primary Examiner

H. E. BEHREND, Assistant Examiner

U.S. Cl. X.R.

73—67.6, 339